June 12, 1951 W. PURCELL 2,556,979
ADJUSTABLE STOP MEANS FOR HYDRAULIC
CYLINDER AND PISTON UNITS
Filed Jan. 19, 1948
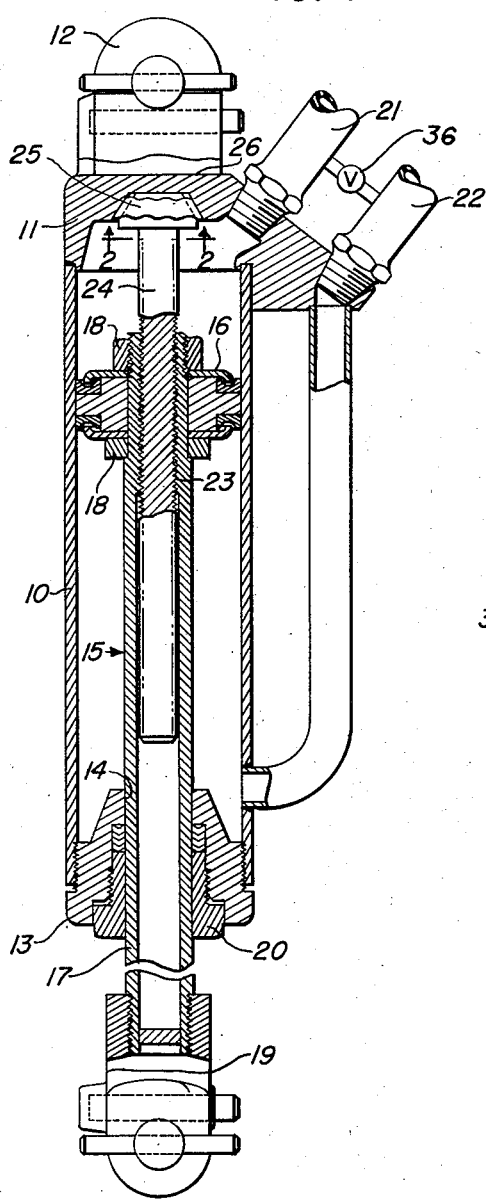
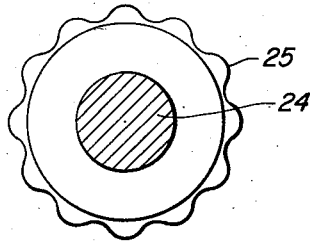
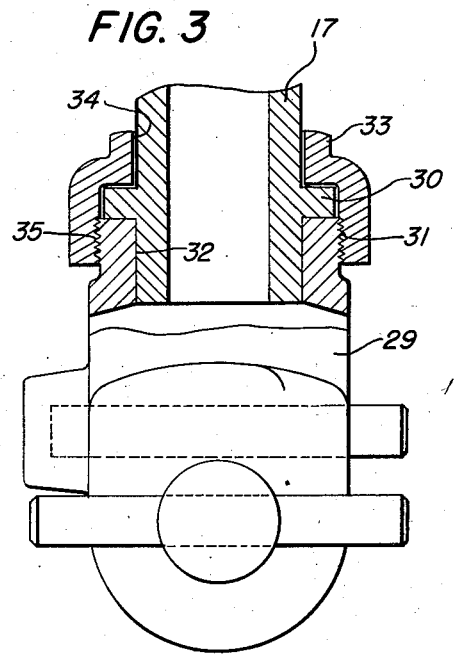
WITNESS:
Ralph W Morgan
INVENTOR.
WILLIAM PURCELL
BY
ATTORNEYS Patented June 12, 1951

2,556,979

UNITED STATES PATENT OFFICE 2,556,979

ADJUSTABLE STOP MEANS FOR HYDRAULIC CYLINDER AND PISTON UNITS

William Purcell, Pasadena, Calif., assignor to Deere Manufacturing Co., Dubuque, Iowa, a corporation of Iowa Application January 19, 1948, Serial No. 3,098

10 Claims. (Cl. 121—38)

This invention relates to hydraulic mechanism and more particularly to means for controlling the maximum positions of the piston with respect to the cylinder.

A device or unit of the class referred to finds its greatest use in the field of controlling agricultural implements, for example, the ordinary plow pulled behind a tractor wherein the tractor is equipped with a hydraulic lift or other power control including a power cylinder on the plow in a position relatively remote from the tractor controls. The cylinder is anchored to a part of the plow frame and the piston rod is connected to means for raising and lowering the plow bottom. The tractor operator thus has at his command a flexible and efficient device for raising and lowering the plow bottom. However, the efficiency of the arrangement is somewhat impaired if it becomes necessary for the operator to readjust the position of the plow bottom each time it is raised or lowered. To eliminate this disadvantage there have been provided prior devices including adjustable stops for limiting the maximum travel of the piston with respect to the cylinder and the lowering of the plow bottom or other implement part to ground-working position. These devices all operate in substantially the same manner; that is to say, their aim is to provide an adjustable stop or abutment which may be set beforehand to limit downward movement of the plow bottom or other implement part.

The present invention contemplates and has for its principal object an improved self-contained stop means for a device of the class referred to above; the invention aims to eliminate external and complicated working parts such as have been heretofore known and features a pair of relatively adjustable members, preferably screw-threaded together, and positioned within the cylinder. Another object of the invention relates to means for mounting the piston rod for rotation in the cylinder so that one of the screw-threaded parts may be rotated while the other is held, it being a further object of the invention to provide simple and effective means for holding said other member. Still another object of the invention relates to means for accomplishing the adjustment without requiring that the cylinder and piston assembly be disconnected from the implement; to this end, there is provided on the cylinder and piston assembly a swivel or similar bearing rotatable on the cylinder axis, so that the piston may be rotated without disconnecting the assembly.

The foregoing and other important and desirable objects inherent in and encompassed by the invention will become apparent from a reading of the ensuing specification and accompanying sheet of drawings wherein there has been shown, by way of example, a preferred form of the invention.

In the drawing:

Figure 1 is a longitudinal cross-sectional view taken through a cylinder and piston assembly including an improved adjustable stop means;

Figure 2 is an enlarged fragmentary view, taken substantially on the line 2—2 of Figure 1, showing a preferred configuration of one of the adjusting members; and Figure 3 is an enlarged view of the piston rod and that is attached to the implement, the view showing a modified form of construction in which the piston rod includes a swivel or bearing on the rod axis.

The cylinder and piston assembly in its basic details is representative of one of the most commonly used types in the field of agricultural implements. These details form no part of the present invention and the illustration thereof in connection with the invention should not be taken as limiting the invention to the particular field disclosed. Likewise, other detailed descriptions and illustrations should be considered as based merely on a preferred form or forms of the invention and not as defining the spirit and scope of the invention.

The cylinder and piston assembly chosen for the purposes of illustration and description comprises an outer motor part in the form of a cylinder member 10 closed at one end by a closure member 11 on which is provided a clevis or similar means 12 for the purpose of attaching the cylinder to an anchoring element or structure such as the frame of a plow or similar implement.

The other end of the cylinder 10 is closed by a member 13 having a central aperture or bore 14 on the axis of the cylinder. A piston and rod assembly or inner motor part or member designated generally by the numeral 15, and including a piston 16 and rod 17, is carried for reciprocation by the cylinder 10. The piston 16 is apertured or bored centrally to receive the inner end of the rod 17 and appropriate securing means, indicated by the numeral 18, is provided for securing the rod to the piston. The rod extends coaxially through the bore 14 in the closure member 13 and the outer end of the rod is threaded or otherwise formed to receive a clevis or similar attaching means, designated generally by the numeral 19, for the purpose of attaching the rod to a movable implement part, such as the means for adjusting a plow bottom. The closure member 13 is provided with a suitable flange or packing 20 for sealing the bore 14 through which the rod 17 passes.

The numerals 21 and 22 indicate fluid lines by means of which fluid is supplied to or exhausted from either end of the cylinder 10 to move the piston back and forth therein.

The piston rod 17 shown here is hollow throughout its length and that portion that passes through the piston 16 is internally threaded, as at 23, to provide one of a pair of adjustable parts or members. The other part or member of the pair is provided by an adjustable member 24, externally screw threaded substantially throughout its entire length and carried by the internally threaded portion 23. In the drawing an intermediate portion of the member 24 has been broken away and shown in section to illustrate the threads thereon. The drawing illustrates diagrammatically that the remainder of the member 24 is similarly threaded.

The member 24 forms a third part of the motor assembly and includes at that end thereof that is proximate to the closure member 11 of the cylinder 10 a head or stop member 25 which disconnectibly interfits with a recess 26 in the member 11. As best shown in Figures 1 and 2, the configuration of the head 25 is on the order of an externally corrugated cone, and the recess 26 is provided with a comparable internally corrugated conical configuration, which provides means selectively operative to restrain the member 24 against rotation.

In the use of the structure shown in Figures 1 and 2 and described above, the cylinder is connected at 12 to anchor structure, such as the frame of an implement (not shown). The outer end of the piston rod is connected at 19 to a movable implement part, for example. Fluid supplied through the line 21 to the upper end of the cylinder 10 will move the piston 16 downwardly in the cylinder, exhausting fluid through the line 22, until the piston reaches the end of its stroke. This result occurs during extension of the hydraulic device including the cylinder and piston. When it is desired to retract the device, fluid is supplied through the line 22 to the lower end of the cylinder, this resulting in movement of the piston 16 upwardly in the cylinder, fluid in the meanwhile being exhausted through the line 21, until the extent of travel of the piston upwardly in the cylinder is stopped by engagement between the head 25 on the member 24 and the closed end 11 of the cylinder. The position at which the piston will stop will, of course, have been predetermined by an adjustment of the member 24 with respect to the piston rod 17, this adjustment having been achieved by relative rotation between the member 23 and rod 17. According to the example illustrated, the piston and rod assembly is moved by hand or by power toward the upper end of the cylinder so that the externally corrugated head 25 interfits with the internally corrugated recess 26, whereupon the member 24 will be held against rotation. The clevis or connection 19 will be disconnected from its association with the implement part, and the piston rod will be rotated to move the piston lengthwise with respect to the cylinder and with respect to the adjustable member 24; such movement will determine the extent to which the member 24 extends at the inner end of the piston rod. The degree of adjustment between the rod 17 and member 24 can be determined by the extent to which the outer end of the rod 17 projects from the end 13 of the cylinder. Accordingly the operator may predetermine the limit of retraction of the hydraulic device comprising the cylinder and piston.

If the device and mechanism just described is equipped with the structure of Figure 3, it will not be necessary to effect a disconnection at 19 for the purpose of rotating the rod 17. In this form of the invention the connection 19 is replaced by a clevis or connection 29 and the piston rod 17 is provided at the outer end thereof with an external annular flange 30. The member 29 is externally threaded at 31 and is internally bored at 32 to receive the extreme outer end of the rod 17; that is, the portion of the rod 17 outwardly of the annular flange 30. The lower radial face of the flange 30 will thrust against the upper radial face of the internally bored and externally threaded portion of the member 29. A cap 33, apertured at 34, to receive the rod 17, and internally threaded at 35 to receive the threads 31 on the member 29, completes the connection between the rod 17 and the member 29. The bore 32 in the member 29 and the bore 34 in the cap 33 provide means including a bearing or swivel on the axis of the cylinder and piston assembly and provide for rotation of the rod 17 with respect to the connecting member 29. The cap 33 and member 29 cooperate with the annular flange 30 on the extreme outer end of the rod 17 to take thrust developed by movement of the cylinder and piston assembly. Except for the fact that it is not necessary to make disconnection at 29, the form of the invention shown in Figure 3 is used in the same manner as that previously described.

The numeral 36 represents diagrammatically a valve, normally closed, which may be opened to provide for free interchange of fluid from one end of the cylinder to the other while adjustment of the piston with respect to the stop member 24 is being accomplished, it being understood that in a hydraulically locked system, it would be impossible for an operator to shift the piston manually in either direction against fluid locked in the end of the cylinder toward which it is desired to move the piston for adjustment.

As previously stated, the particular association between parts and the detailed structure thereof are selected only for the purposes of illustration. Likewise, the swivel or bearing structure shown in Figure 3 is merely representative of one of many types that could be employed. It is not desired, therefore, that the invention be limited otherwise than by the spirit and scope of the invention as set forth in the appended claims.

I claim:

1. A hydraulic cylinder and piston unit of the class described, comprising: a cylinder having first closure means at one end and a second centrally apertured closure means at its other end; means connected to the cylinder at the first named end for attaching the cylinder to a support or the like; a piston within the cylinder and having a central opening on the cylinder axis; a piston rod, having an inner end within the cylinder and passing through the opening in the piston, and an outer end extending coaxially through the apertured closure means and slidably and rotatably carried thereby; means at the outer end of the piston rod for attachment of the rod to an external element; means on the inner end of the rod providing a hollow internally screw-threaded, coaxial portion; an externally screw-threaded member carried by said internally screw-threaded portion within the cylinder and extending toward the first closed end of the cylinder to be threaded into or out of the internally threaded piston rod portion, by relative rotation of said member and the piston rod, to provide an adjustable stop for abutting said end of the cylinder in advance of the piston; and means within the cylinder adjacent the first closure means and cooperable between said member and the cylinder for holding said member against rotation while the piston rod is rotated to accomplish said adjustment.

2. The invention defined in claim 1, further characterized in that the attachment means at the outer end of the piston rod includes a swivel part on the piston rod axis whereby the rod may be rotated relative to said swivel part and said part may remain attached to said external element.

3. The invention defined in claim 1, further characterized in that: the means for holding the externally threaded member against rotation includes a portion defining a recess in the first closure means and a cooperable disconnectible, interfitting portion on said member.

4. The invention defined in claim 3, further characterized in that the recess has an internal configuration on the order of a corrugated internal cone and the portion on the member is a comparable externally corrugated cone.

5. A hydraulic cylinder and piston unit of the class described, comprising: a cylinder having a first closure means at one end and a second, centrally apertured closure means at its other end; means connected to the cylinder at the first named end for attaching the cylinder to a support or the like; a piston within the cylinder and including a rod extending coaxially of the cylinder and outwardly through the apertured closure means, said rod being rotatably and slidably carried by said apertured closure means; means at the outer end of the piston rod for attachment of the rod to an external element; means on the piston providing a screw-threaded portion on an axis running lengthwise of the cylinder; a stop member comparably screw-threaded and carried by said portion to be threaded toward or away from the piston in a direction lengthwise of the cylinder, upon relative rotation of said member and the piston, to provide an adjustable stop for abutting one end of the cylinder in advance of the piston; and means wholly within the cylinder including cooperable parts of the cylinder and the stop member for holding the latter against rotation while the piston is rotated to accomplish said adjustment.

6. A hydraulic cylinder and piston assembly for attachment between an anchoring element and a relatively movable work-receiving element, comprising: a cylinder member having opposite ends, the first of which is closed and the second of which has a central opening on the cylinder axis; a piston and rod member within the cylinder, the rod extending axially through said central opening and rotatably and slidably carried by said second end of the cylinder member; means on the cylinder member for attachment to one of the aforesaid elements; means on the piston and rod member outside the cylinder member for attachment of said latter member to the other of the aforesaid elements; one of said attachment means including a bearing on the cylinder axis to provide for rotation of one of said members with respect to said elements without disconnection of said attachment means; and adjustable stop means wholly within the cylinder including a pair of parts screw-threaded together on an axis lengthwise of the cylinder, one of said parts being fixed to one member so that both parts are normally carried by said one member, and the other part being at times non-rotatably engageable with the other member upon relative axial movement of the members for effecting adjustment of one part relative to the other by rotation of one member with respect to the other.

7. A hydraulic cylinder and piston assembly for attachment between an anchoring element and a relatively movable work-receiving element, comprising: a cylinder member having opposite ends, the first of which is closed and the second of which has a central opening on the cylinder axis; a piston and rod member within the cylinder, the rod extending axially through said central opening and rotatably and slidably carried by said second end of the cylinder member; means on the cylinder member for attachment to one of the aforesaid elements; means on the piston and rod member outside the cylinder member for attachment of said latter member to the other of the aforesaid elements; and adjustable stop means wholly within the cylinder including a pair of parts screw-threaded together on an axis lengthwise of the cylinder, one of said parts being fixed to one member so that both parts are normally carried by said one member and the other part being at times non-rotatably engageable with the other member upon relative axial movement of the members and for effective adjustment of one part relative to the other by rotation of one member with respect to the other.

8. A hydraulic cylinder and piston assembly, comprising: a cylinder member having opposite ends, the first of which is closed and the second of which includes a centrally apertured portion on the cylinder axis; a piston and rod member carried by the cylinder for reciprocation therein along the cylinder axis and having a portion carried by the centrally apertured portion for movement about the cylinder axis; and means wholly within the cylinder providing an adjustable stop, including a pair of cooperable parts, one carried by one member and the other at times fixedly engageable with the other member upon relative axial movement of the members and connected together by cooperable portions for retraction or extension in the path of the piston and rod member within the cylinder by relative movement of the members about the cylinder axis.

9. A hydraulic motor, comprising: an outer motor part in the form of a cylinder having first closure means at one end and second, centrally apertured closure means at its other end; means at said first end for attaching the cylinder to a support or load; an inner motor part slidably fitting within the cylinder and movable selectively back and forth between said ends of the cylinder; said inner motor part including a piston and a piston rod connected centrally to said piston and extending outwardly through said apertured closure means for attachment to a load or support; said inner motor part having within the cylinder an axially hollow and internally screw-threaded portion opening endwise to the first named end of the cylinder; a third part completely enclosed within and at times rotatable relative to the cylinder and including a member extending axially between said first named end of the cylinder and the inner motor part and having external screw threads thereon threaded into the inner motor part so that said inner motor part and said third part are at times relatively angularly and axially movable by means of said screw threads; and means including an axially shiftable element selectively cooperative between an inner portion of the cylinder at said first named end and a proximate portion of said third part for restraining said third part against rotation relative to the cylinder.

10. A hydraulic motor, comprising: an outer motor part in the form of a cylinder having first closure means at one end and second, centrally apertured closure means at its other end; means at said first end for attaching the cylinder to a support or load; an inner motor part slidably fitting within the cylinder and movable selectively back and forth between said ends of the cylinder; said inner motor part including a piston and a piston rod connected centrally to said piston and extending outwardly through said apertured closure means for attachment to a load or support; said inner motor part having a portion extending axially from the piston toward said first named end of the cylinder and said portion having screw threads formed about its axis; a third part completely enclosed within and at times rotatable relative to the cylinder and including a member extending axially between said first named end of the cylinder and the inner motor part and having screw threads thereon threaded into engagement with said screw-threaded portion so that said inner motor part and said third part are at times relatively angularly and axially movable by means of said screw threads; and means within the cylinder and selectively cooperative between the cylinder and said third part for restraining said third part against rotation relative to the cylinder.

WILLIAM PURCELL.

REFERENCES CITED

The following references are of record in the file of this patent:

UNITED STATES PATENTS

| Number | Name | Date |
|---|---|---|
| 652,983 | Steedman | July 3, 1900 |
| 1,325,006 | Dearsley | Dec. 16, 1919 |
| 2,397,106 | Haller | Mar. 26, 1946 |